(12) United States Patent
Rodriguez (10) Patent No.: US 11,172,774 B1
(45) Date of Patent: Nov. 16, 2021

(54) HANGER ORGANIZER (71) Applicant: Juan Rodriguez, Tierra Verde, FL (US)

(72) Inventor: Juan Rodriguez, Tierra Verde, FL (US)

(*) Notice: Subject to any disclaimer, the term of this patent is extended or adjusted under 35 U.S.C. 154(b) by 0 days.

(21) Appl. No.: 16/170,808

(22) Filed: Oct. 25, 2018

(51) Int. Cl.
F16M 11/00 (2006.01)
A47G 25/28 (2006.01)
A47G 25/74 (2006.01)
F16M 13/02 (2006.01)

(52) U.S. Cl.
CPC ......... A47G 25/28 (2013.01); A47G 25/743 (2013.01); F16M 13/02 (2013.01)

(58) Field of Classification Search
CPC .......... F16B 45/00; A47F 5/0006; A47F 7/00; A47G 25/74
See application file for complete search history.

(56) References Cited

U.S. PATENT DOCUMENTS

| 760,171 | A | * | 5/1904 | Atwell | |
|---|---|---|---|---|---|
| 4,750,697 | A | | 6/1988 | Tontarelli | |
| 4,897,952 | A | | 2/1990 | Hawie | |
| 5,577,644 | A | * | 11/1996 | Chen | A47G 25/0607 223/85 |
| 6,478,168 | B1 | | 11/2002 | McNamee | |
| 6,530,345 | B2 | * | 3/2003 | Donze | A01K 27/005 119/772 |
| D492,188 | S | | 6/2004 | Goldberg | |
| D569,714 | S | | 5/2008 | Steward | |
| D592,939 | S | | 5/2009 | Kelleghan | |
| D671,293 | S | | 11/2012 | Fredriksson | |
| 9,453,527 | B2 | * | 9/2016 | Yoo | A47G 29/083 |
| D858,115 | S | * | 9/2019 | Rodriguez | D6/315 |
| 2010/0071413 | A1 | * | 3/2010 | Shamlian | A44C 5/0007 63/1.12 |
| 2012/0103029 | A1 | | 5/2012 | Darwin | |

* cited by examiner

Primary Examiner — Amy J. Sterling (57) ABSTRACT

A hanger organizer is provided for supporting and organizing a plurality of articles in a hanging position. The apparatus includes a mechanism that enable multiple items to be hang in an efficient manner and easily be removed from the device. The apparatus includes a hanging element, a connector body, and a ring assembly connected to the hanging element is connected to the top side and the bottom side has a support. The ring assembly moves around the support and can be opened or closed. A biasing element located between the ring main body and a closable element keeps the ring assembly closed until items are hung on the ring assembly.

13 Claims, 16 Drawing Sheets

HANGER ORGANIZER

CROSS-REFERENCE TO RELATED APPLICATION

This application claims the benefit of U.S. Provisional Application No. 65/576,753, filed Oct. 25, 2017.

1. Field of the Invention

The present invention relates in general to a device for ease of use for organizing a plurality of articles.

2. Description of the Related Art

There are various hanger devices available for hanging clothing, wearables accessories and hardware of all sorts. For example in U.S. Pat. No. 6,478,168, a belt hanger allows multiple belts to be hung on one hook, keeping the belts spaced in a giving distances to each other to keep organized. This reference discloses a hook that is mounted stationary on a circular ring that has a parade of stationary pins mounted on its internal circumference allowing it to keep the desired distant between each hung item. The ring also allows to attach multiple sizes of hooks, to be used to hang other type of items other than belts. Additionally, this prior art disclosed pins and hooks which can be problematic where clothing articles can be tangled in them.

Further, organizers for accessories, clothing articles and hardware have one or more hooks to receive items. Each hook usually is designed to hold several articles such that a front article blocks the access to a back article, resulting in the requirement to remove some or all the items between the end of the hook to reach the desire item, following the process of placing the unneeded articles back into the hook, making this process impractical and time consuming.

In view of the above, there is a need for an easier hanger system that easily allows to hung and remove articles quickly from the device in an efficient manner that avoids the need of the removal of undesired items.

The present invention has been developed to help address these needs.

SUMMARY OF THE INVENTION

The present invention manages the hanging of all types of items that fit in multiple size rings as well the removal of those hanging items in and easy quick manner. Its efficiency allows for less time consumed in the removal of each item from its supporting ring solving the problem of removing undesired items from a hanger and reaching a specific selected item among the others items held on the hanger by a user. Thus, the device has a mechanism that enables multiple items to be hung and easily be removed from the organizer device in any order. In other words, an item may be added or removed at any position relative to other items that may be on the ring.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated are examples. It is understood that the invention is not limited to the precise arrangements and instrumentalities shown, wherein:

FIG. 1 illustrates a front perspective view of the device of the invention in a closed orientation.

FIG. 1 illustrates a front perspective view of the device of the invention in a closed orientation.

DETAILED DESCRIPTION OF THE INVENTION

The present invention relates to a hanger organizer and a method for hanging objects. FIGS. 1-8 illustrate the hanger of the invention in a closed orientation. FIGS. 9-13 illustrate the hanger of the invention in an open orientation.

FIGS. 1-13 show the hanger organizer, or hanger 10 including a hanging element 12, a connector body 14, and a ring assembly 16. The hanging element 12 may include a generally C-shaped hook 18 which may be on a shaft 20. Alternatively, a knob 21 may be placed on the end of the shaft 20 so that the hanger 10 may be used with hanging systems using a slit in an overhanging member, where a knob prevents the hanger 10 from falling through. This system is often used in closets in hotels. Other means for hanging the hanger 10 with the hanging element 12 known in the art are also contemplated.

The hanging element 12 is connected to a connector body 22. The connector body has a top side 24 and a bottom side 26. The hanging element 12 is connected to the top side 24. The connection between the hanging element 12 and the connector body 22 may be fixed, or the connection may allow the hanging element 12 to rotate on an axis such as the shaft 20.

Figure 14:
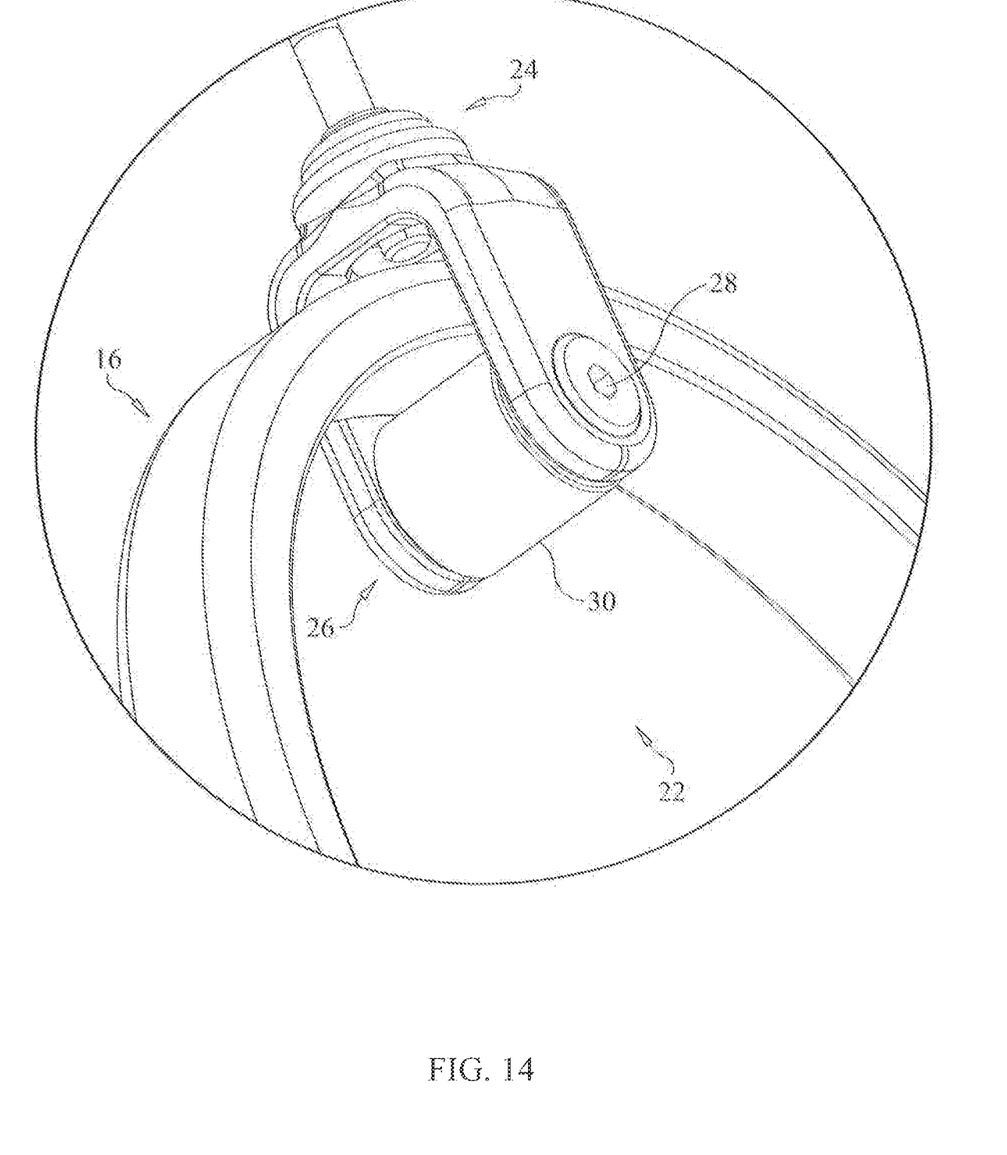
FIG. 14 illustrates a detail perspective view of the connector body of the invention.

The bottom side 26 of the connector body 22 includes a transverse support 28. The transverse support, or roller, may be rotatably connected to the bottom side 26 of the connector body 22. As shown in FIG. 14, the transverse support 28 includes a horizontal axis 29 and a rotatable ring support 30 located around the circumference of the transverse support 28. The rotatable ring support 30 may also include a groove 31 complementary to the circumference of the ring assembly 16. In one embodiment, both the transverse support 28 and the rotatable ring support 30 may be rotated.

As shown in FIGS. 1-13 and FIGS. 15-16, the ring assembly 16 is located movably around the transverse support 28. The ring assembly 16 has an open orientation and a closed orientation. The ring assembly 16 includes a ring main body 32 and one or more closable elements 34 in hinged attachment to the ring main body 32 by a hinge 36. The ring assembly 16 also includes a biasing element 38 such as a coil spring located between the ring main body 32 and the closable element 34. The ring assembly 16 is in an open orientation when the biasing element 38 is in an active configuration such as when a coil spring is compressed. The ring assembly 16 is in the closed orientation when the biasing element is in an inactive configuration, such as when compression of the coil spring is released.

Figure 15:
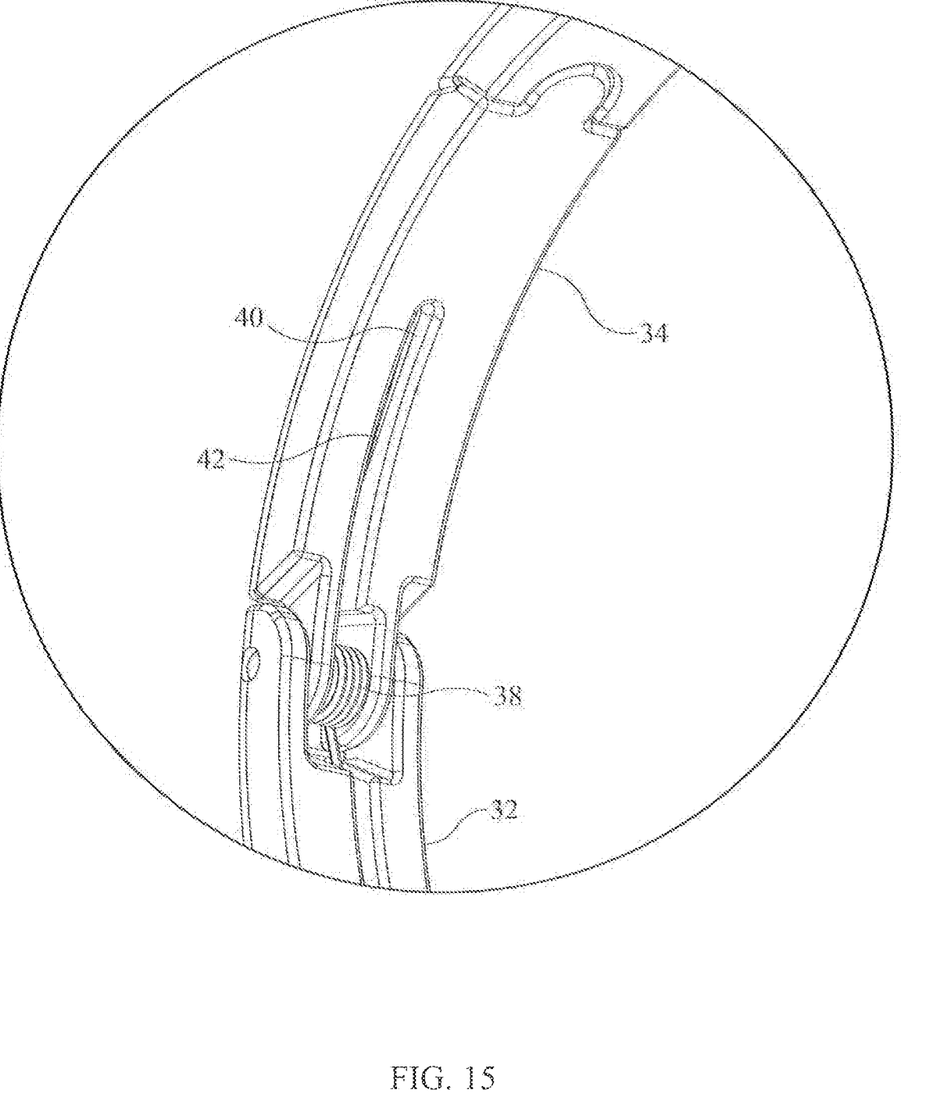
FIG. 15 illustrates a detail perspective view of the biasing element of the device of the invention in a closed orientation.
Figure 16:
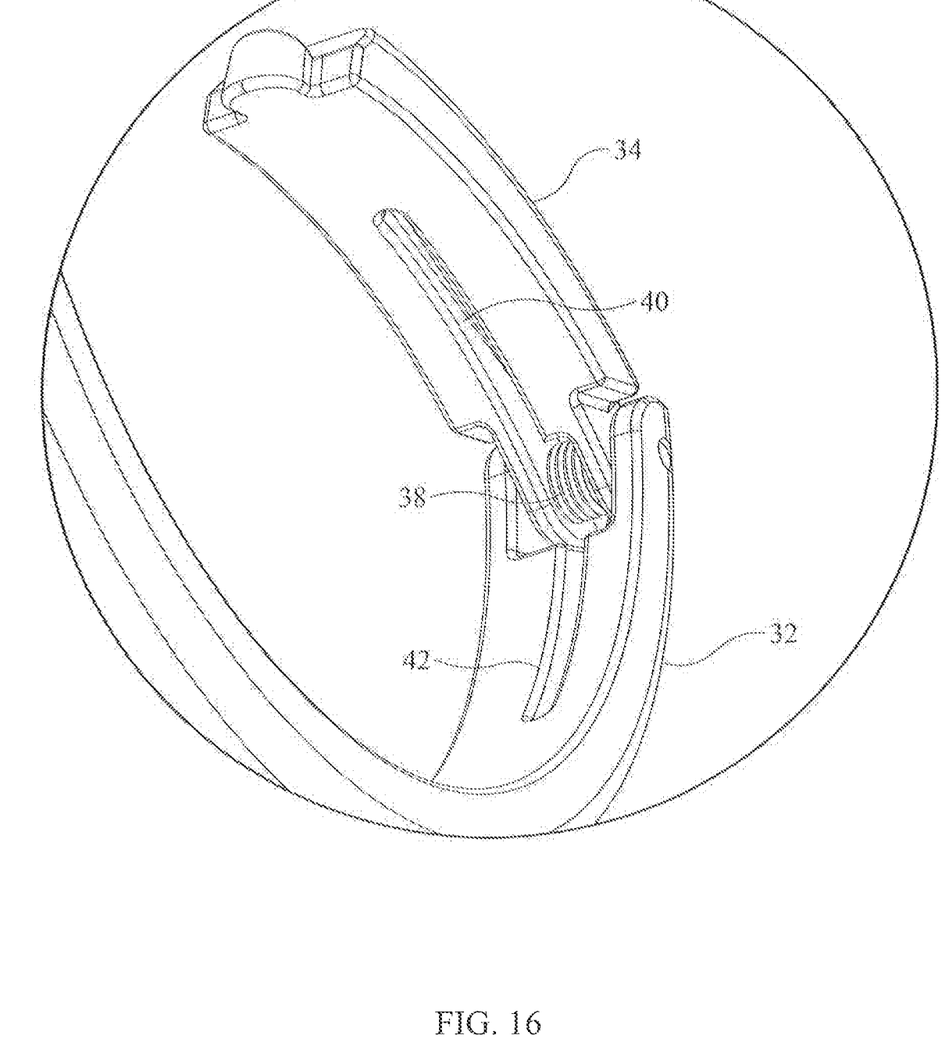
FIG. 16 illustrates a detail perspective view of the biasing element of the device of the invention in an open orientation.

As shown in FIG. 15, one or more ends 40 of the biasing element 38 may be located in recesses 42 on an interior surface of the ring main body and an interior surface of the closable element 34. This configuration may reduce the likelihood that a hung object located around the ring assembly 16 may come in contact with part of the biasing element 38. In addition, on the closable element 34 opposite the hinged attachment to the main ring body, a protrusion 44 may be made complementary to a recession 46 in inner surface of the ring main body 32. The pairing of the protrusion 44 with the recession 46 allows for a smoother inner surface of the ring assembly 16 when the ring assembly 16 is closed.

Figure 1A:
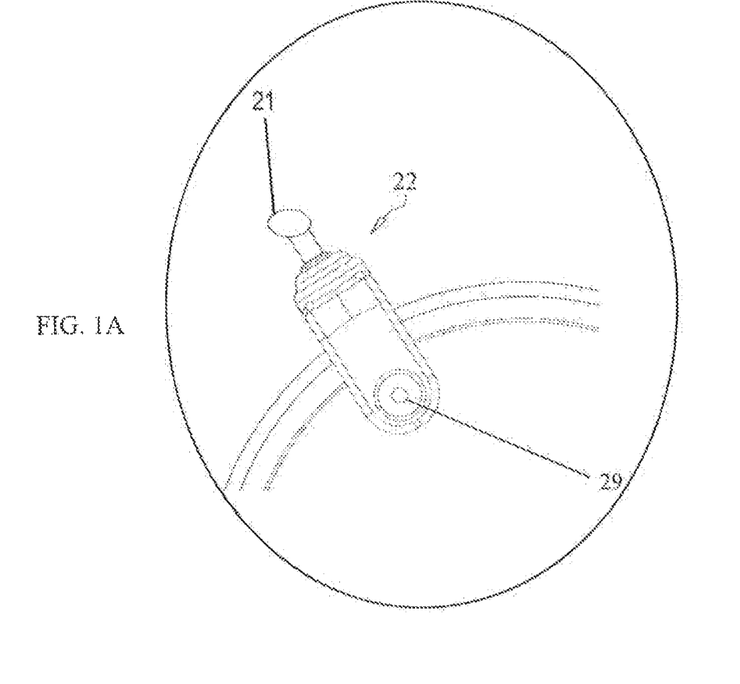
FIG. 1A illustrates a side detail view of the connector body and an embodiment of the ring of the invention.
Figure 1B:
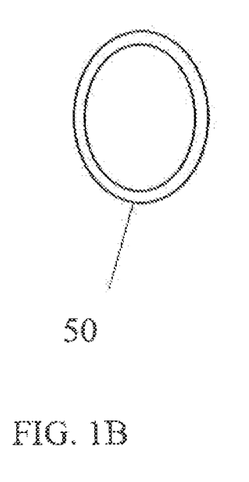
FIG. 1B illustrates a side view of an alternative embodiment of the ring of the invention.
Figure 1C:
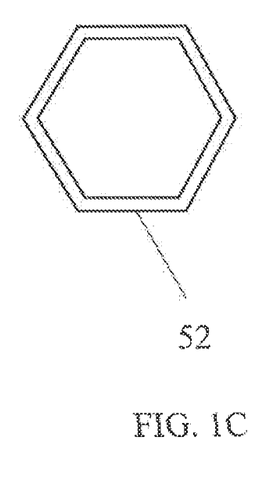
FIG. 1C illustrates a side view of another alternative embodiment of the ring of the invention.
Figure 1D:
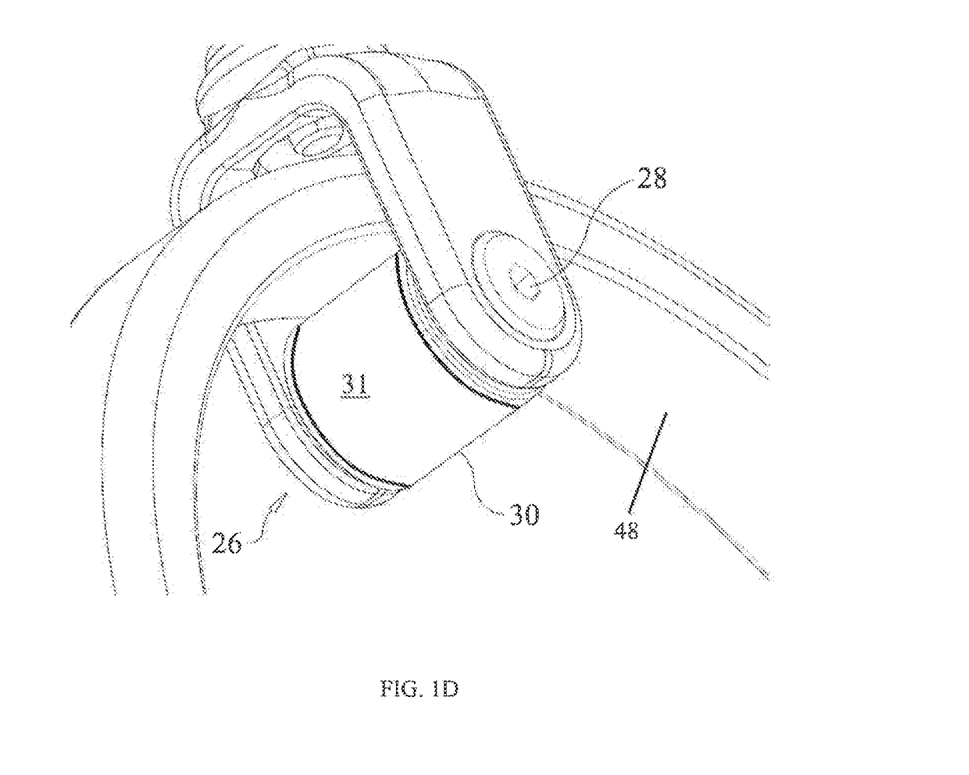
FIG. 1D illustrates a perspective detail view of the device of the invention having a groove.
Figure 2:
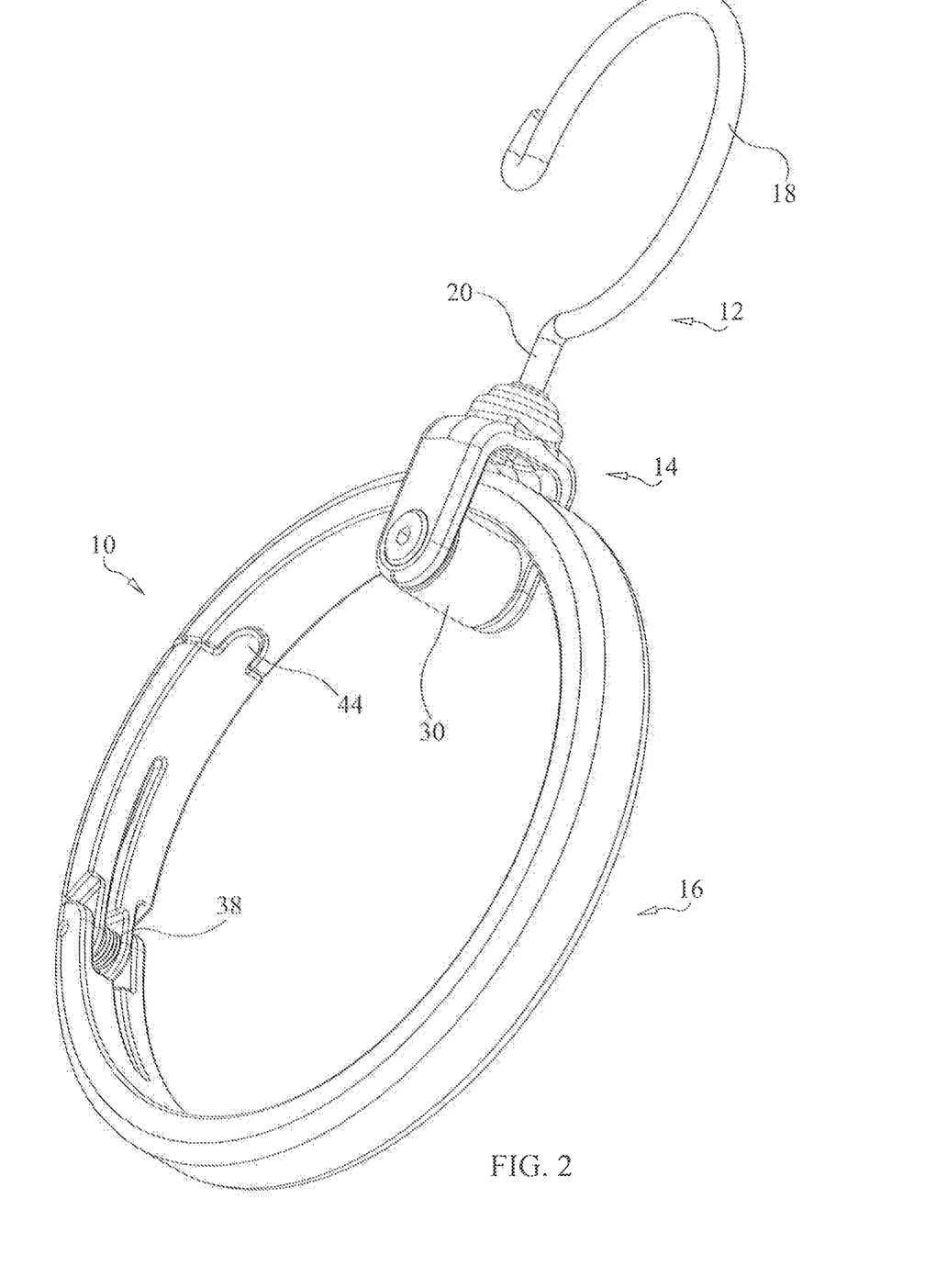
FIG. 2 illustrates a back perspective view of the device of the invention in a closed orientation.
Figure 3:
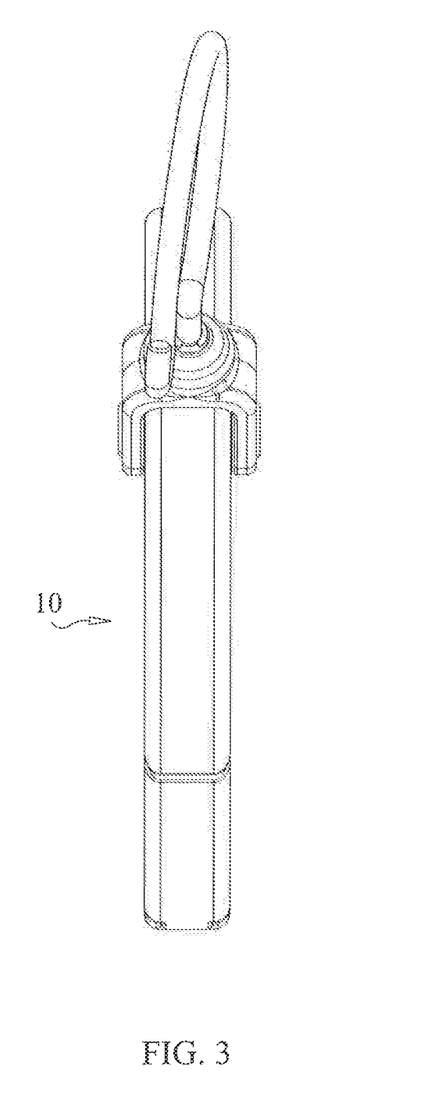
FIG. 3 illustrates a top view of the device of the invention.
Figure 4:
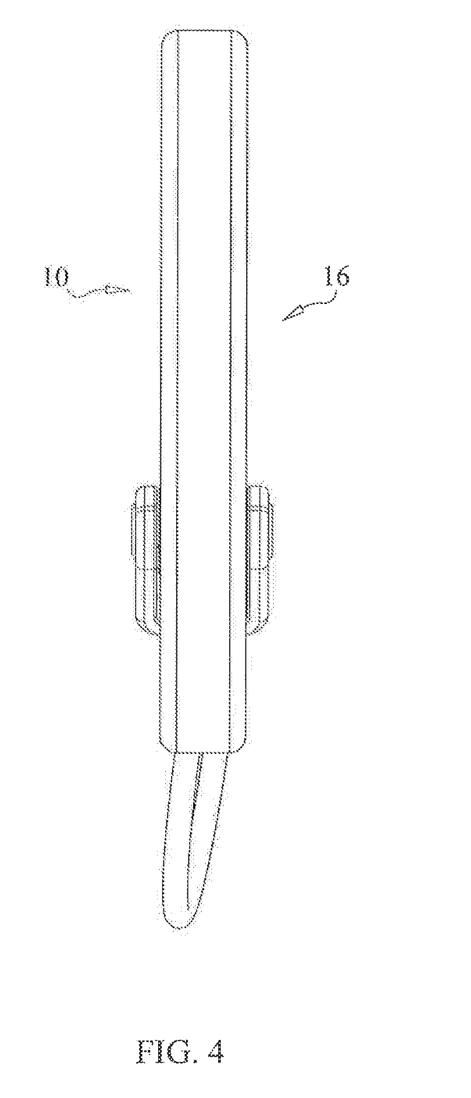
FIG. 4 illustrates a bottom perspective view of the device of the invention.
Figure 5:
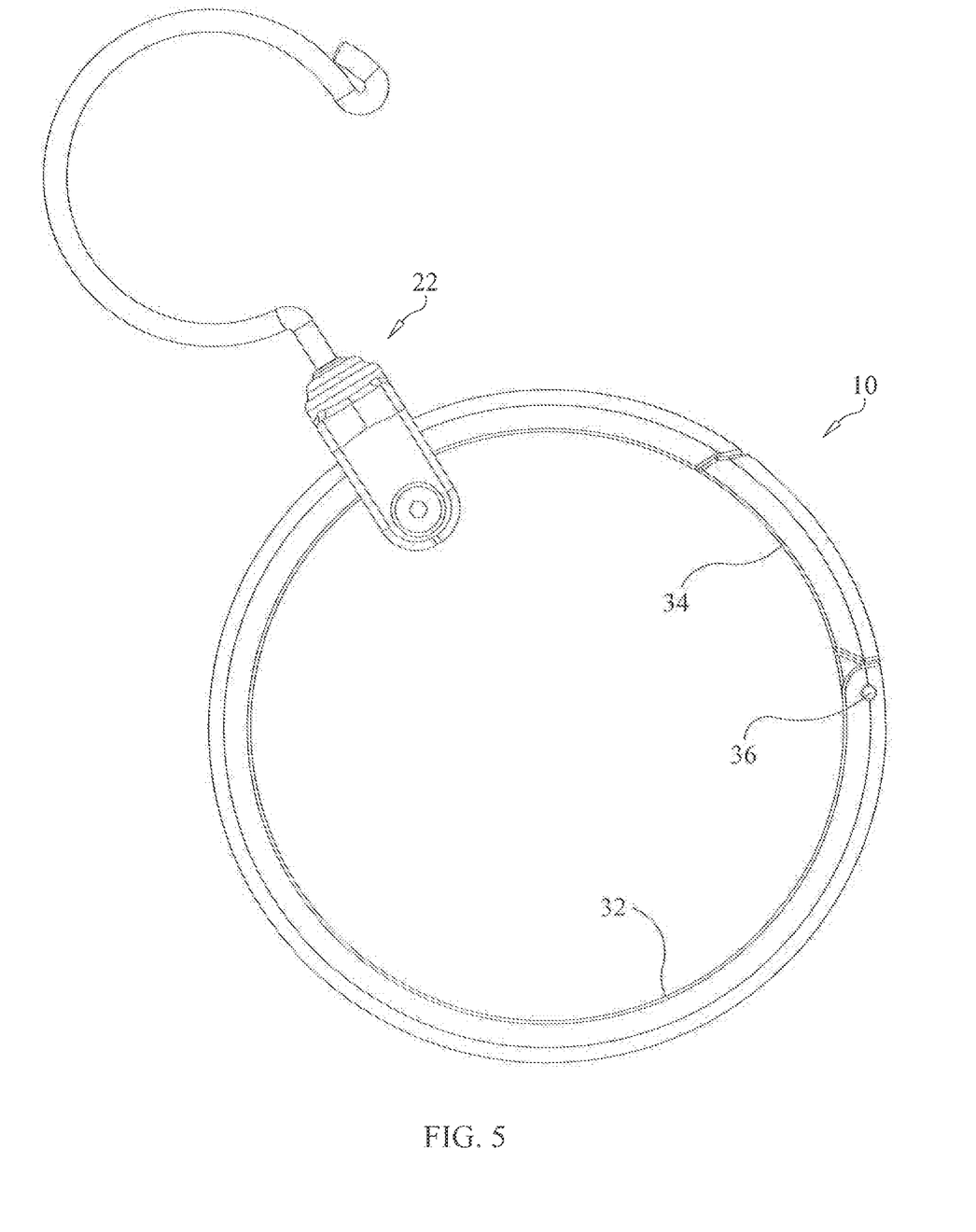
FIG. 5 illustrates a first side view of the device of the invention.
Figure 6:
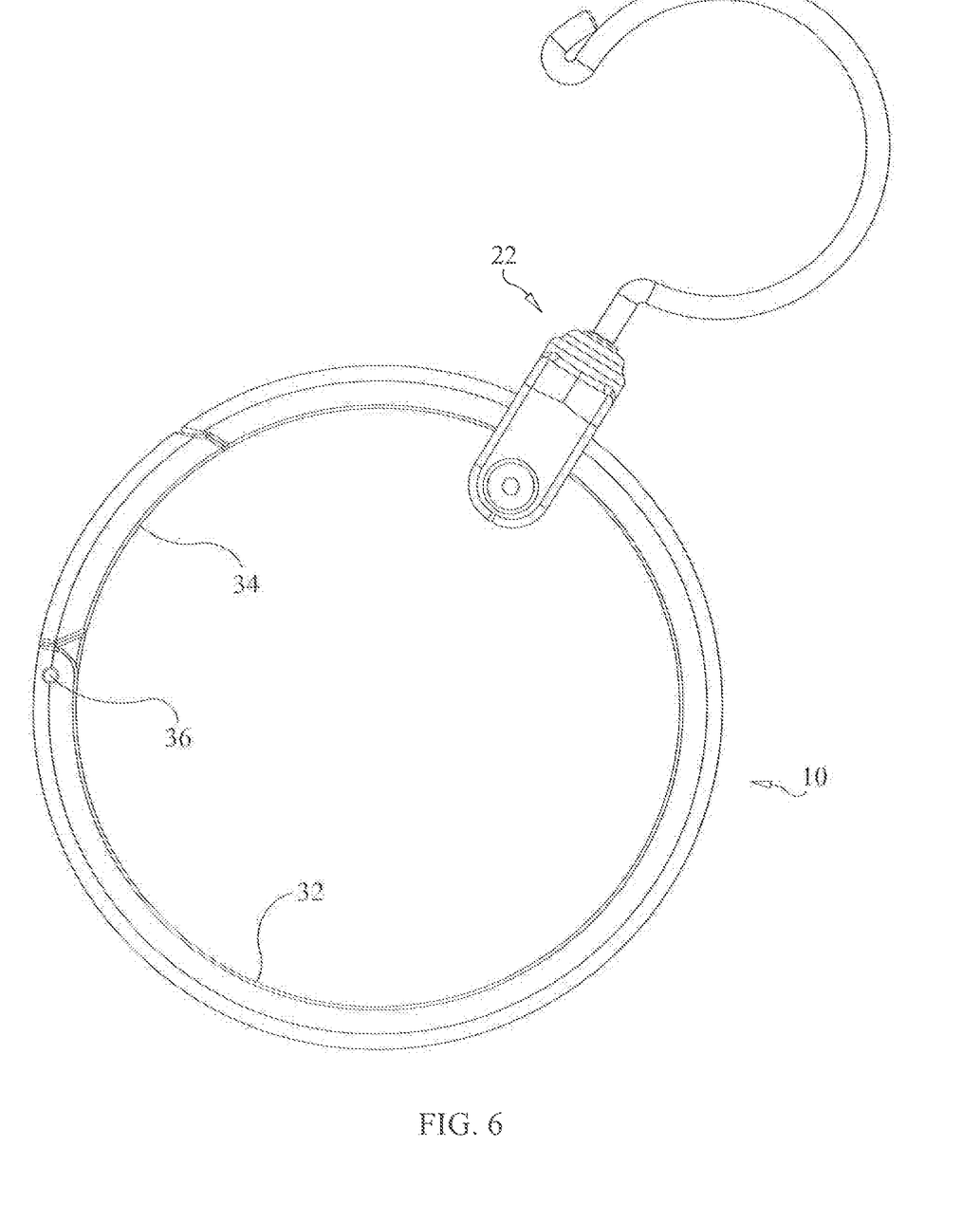
FIG. 6 illustrates a second side view of the device of the invention.
Figure 7:
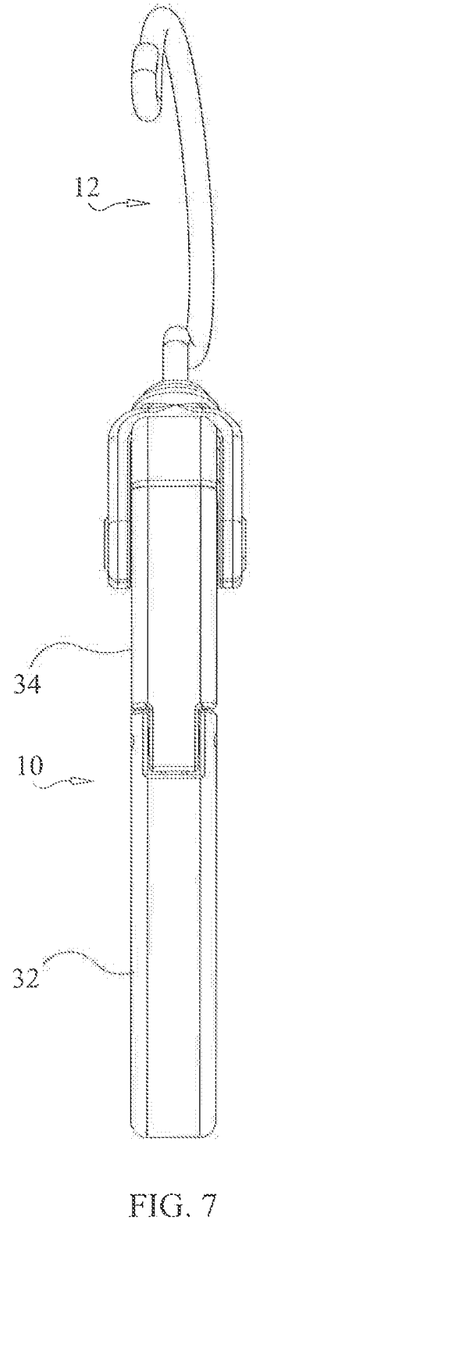
FIG. 7 illustrates a front view of the device of the invention.
Figure 8:
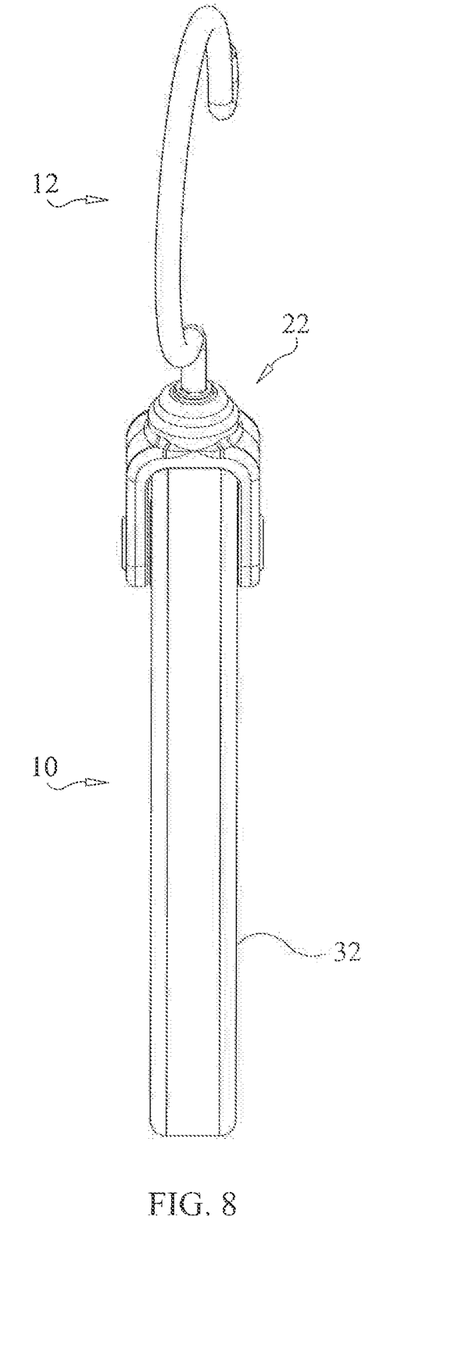
FIG. 8 illustrates a back view of the device of the invention.
Figure 9:
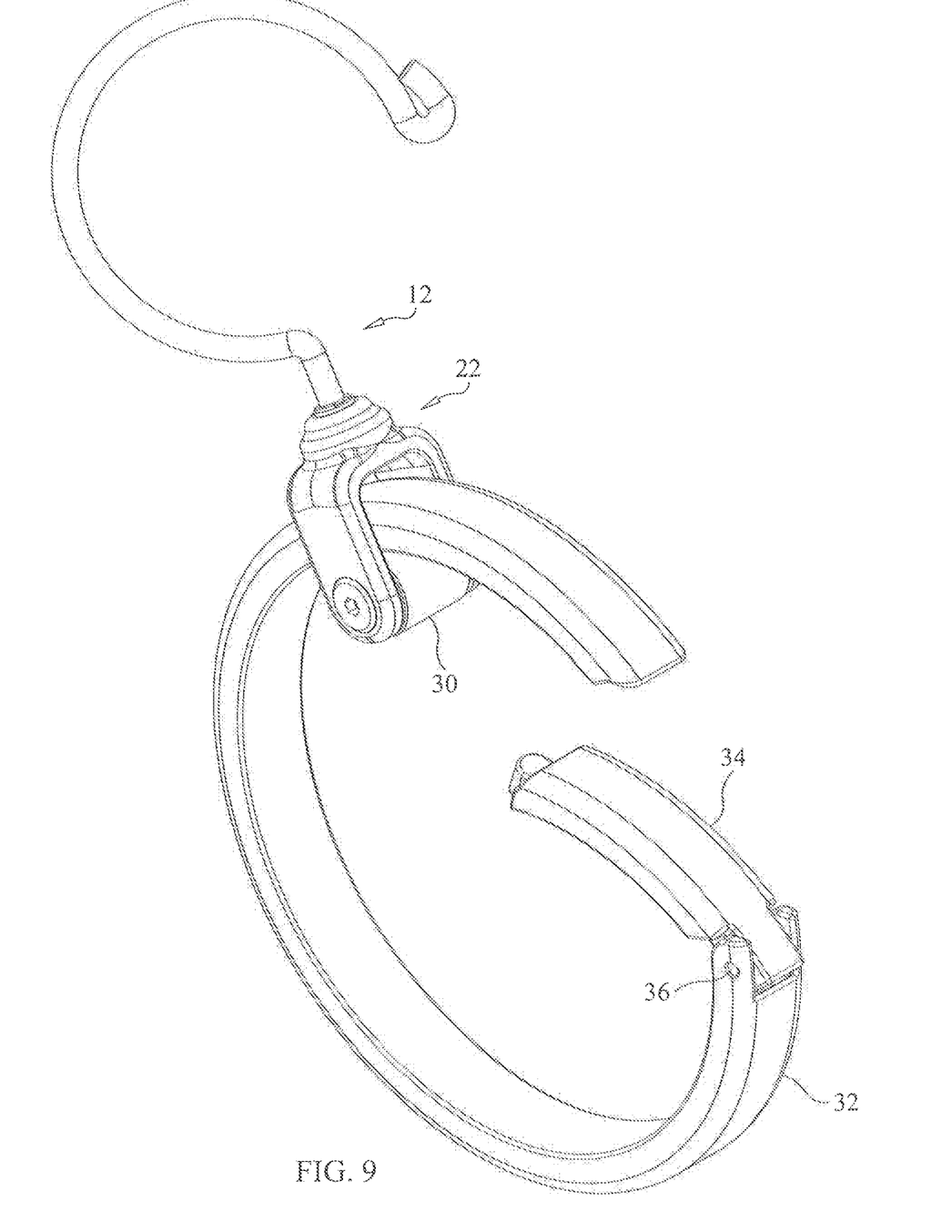
FIG. 9 illustrates a front perspective view of the device of the invention in an open orientation.
Figure 10:
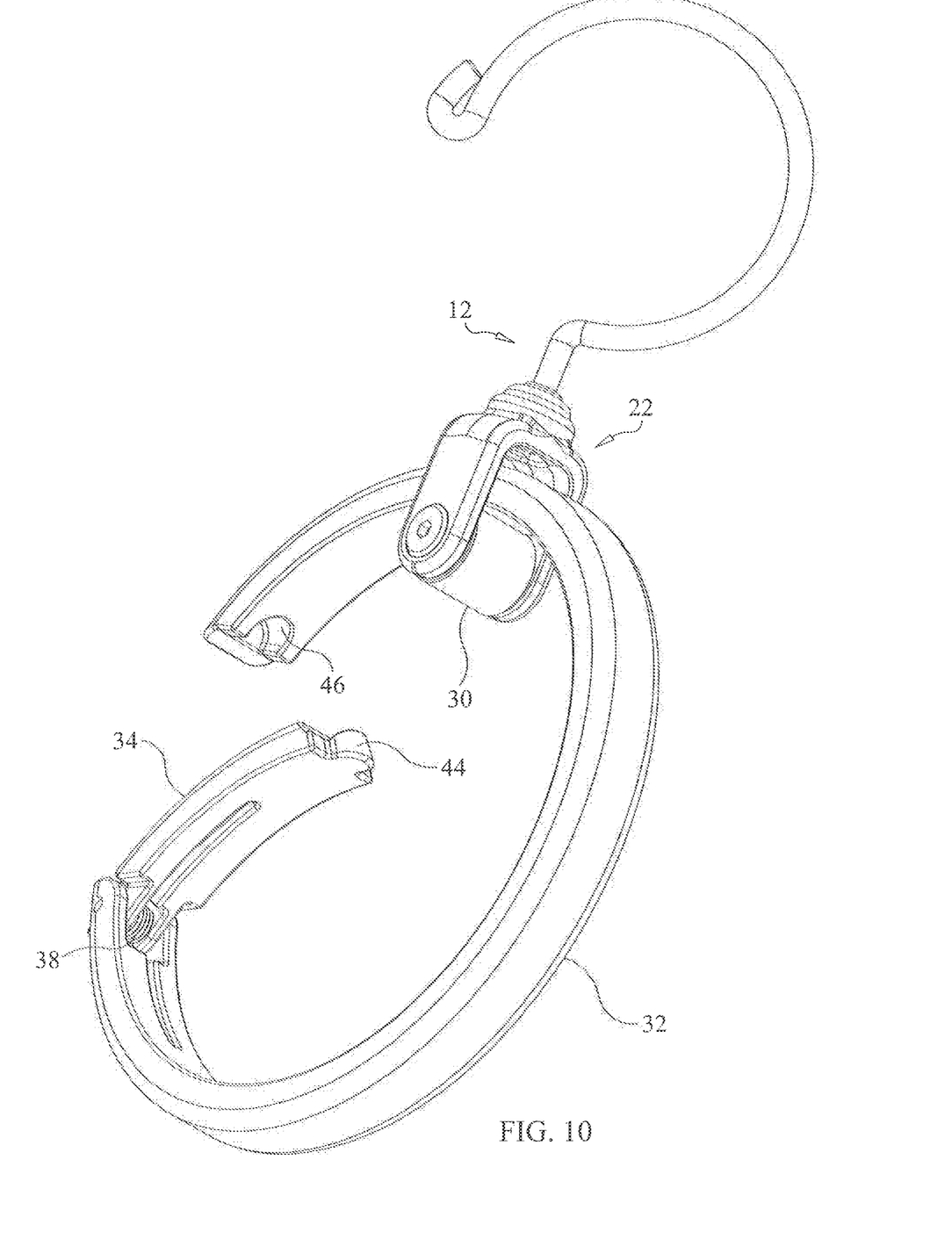
FIG. 10 illustrates a back perspective view of the device of the invention in an open orientation.
Figure 11:
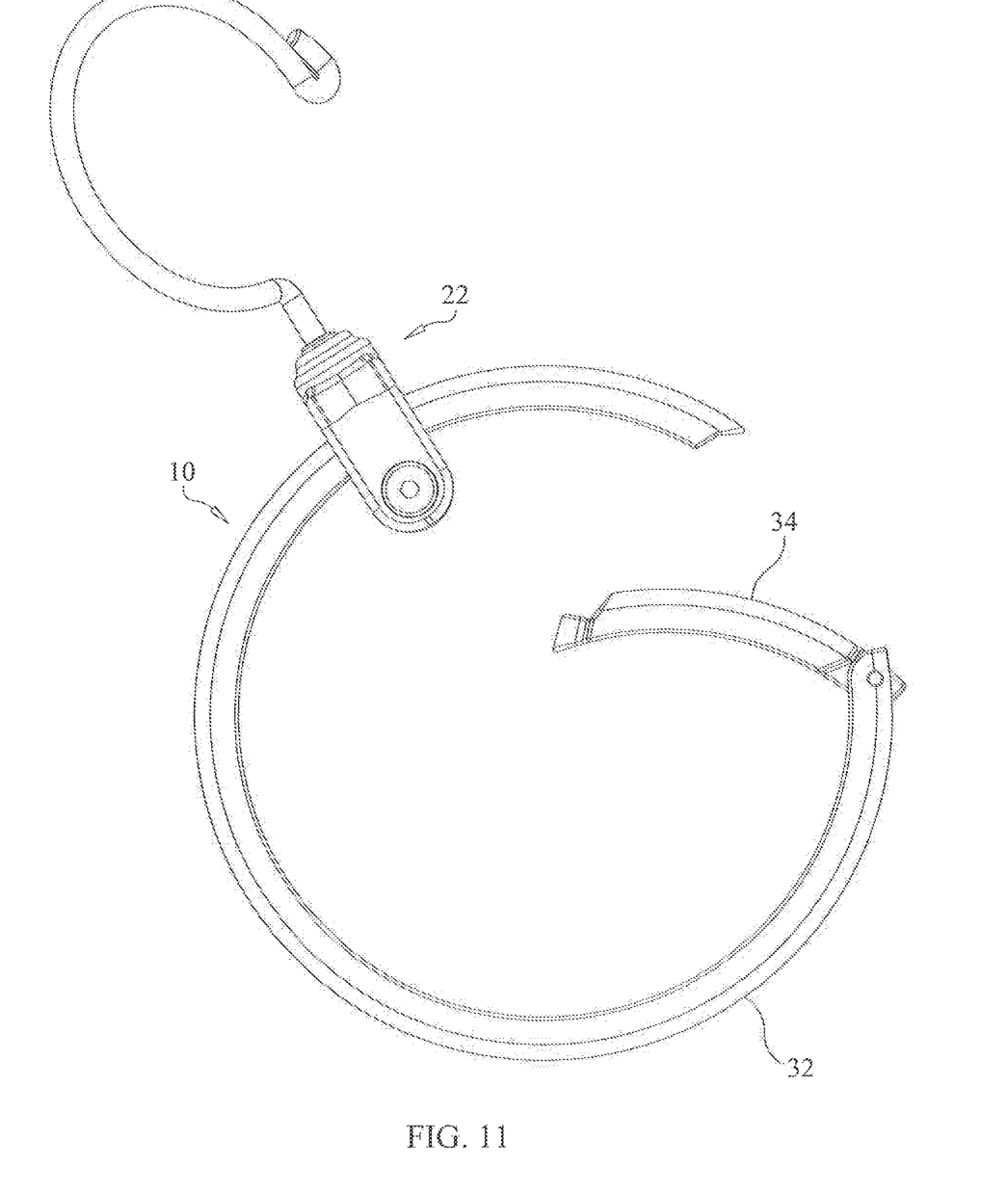
FIG. 11 illustrates a first side view of the device of the invention in an open orientation.
Figure 12:
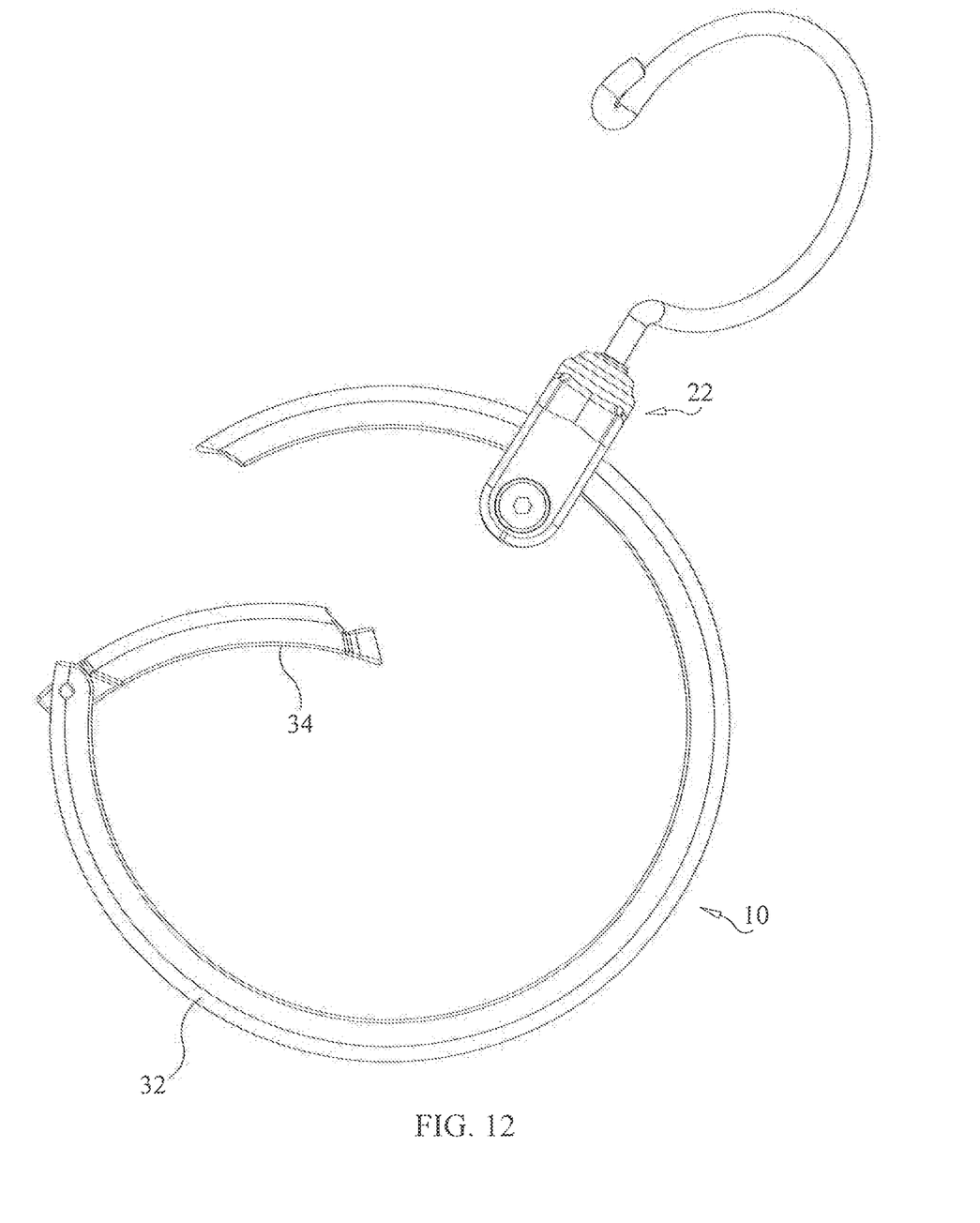
FIG. 12 illustrates a second side view of the device of the invention in an open orientation.
Figure 13:
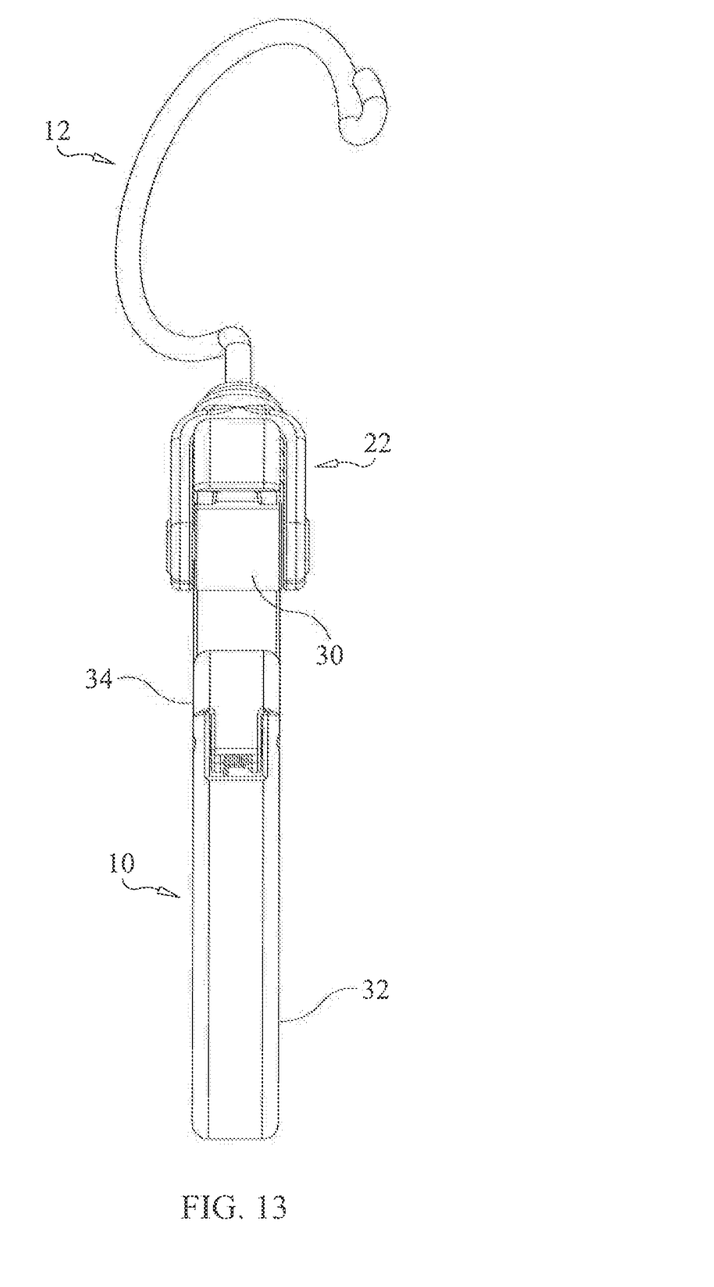
FIG. 13 illustrates a front view of the device of the invention in an open orientation.

The ring assembly shape may be circular 48, polygonal 50 or oval 52, and may have indentations to help separate items being hung in the ring assembly.

One method of use of the invention is as follows:

The hanger organizer is hung up on a bar or by other means known in the art. The user then forces the biasing element into the active configuration so that the ring assembly is in an open configuration. The user then puts an object on the main ring body, such as a belt, handkerchief, bracelet, purse, scrunchie, or other objects that may have hooks or rings, whether or not they are fashion accessories. The user then allows the ring assembly to be configured in the closed orientation by removing the force putting the biasing element in the active configuration. The objects may also be placed upon the hanger organizer before the hanger is hung up.

The hanger may be adapted to larger or smaller items than personal accessories. Other changes and substitutions may be made without departing from the invention herein.

The foregoing description of the invention has been presented for the purposes of illustration and description only. It is not intended to be exhaustive or to limit the invention to the precise form disclosed. Modifications and variations are possible in light of the above teaching. It is intended that the scope of the invention not be limited by this detailed description, but by the claims and the equivalents to the claims appended hereto.

What is claimed is:

1. A hanger, comprising:
    a hanging element;
    a connector body having a top side and a bottom side, wherein the hanging element is connected to the top side, and
    wherein the bottom side comprises a 360 degree rotatable transverse support having a horizontal axis; and
        a ring assembly having an open orientation and a closed orientation, located movably around the transverse support, the ring assembly comprising
        a ring main body,
        one or more closable elements in hinged attachment to the ring main body, and
        a biasing element located between the ring main body and the closable element,
    wherein the biasing element includes an active configuration and an inactive configuration, and
    wherein the ring assembly is in the open orientation when the biasing element is in the active configuration, and the ring assembly is in the closed orientation when the biasing element is in the inactive configuration.

2. The hanger of claim 1, wherein the hanging element comprises a generally C-shaped hook.

3. The hanger of claim 1, wherein the hanging element comprises a shaft and a knob at a top end of the shaft.

4. The hanger of claim 1, wherein the ring assembly shape is one of the following shapes: circular, polygonal and oval.

5. The hanger of claim 1, wherein the biasing element is a coil spring.

6. The hanger of claim 1, wherein the hanging element is rotatably connected to the top side of the connector body.

7. The hanger of claim 1, wherein the transverse support is rotatably connected to the bottom side of the connector body.

8. The hanger of claim 1, wherein the transverse support includes a rotatable ring support located around the circumference of the transverse support.

9. The hanger of claim 8, wherein the rotatable ring support includes a groove complementary to a circumference of the ring assembly.

10. The hanger of claim 1, wherein the transverse support is a roller.

11. A device for hanging objects, comprising:
    a hanging element;
    a connector having a top side and a bottom side, wherein the hanging element is connected to the top side, and
    wherein the bottom side comprises a 360 degree rotatable horizontal axle; and
        a ring assembly having an open alignment and a closed alignment, located movably around the axle, the ring assembly comprising
        a ring main body,
        one or more closable elements hinged on one side to the ring main body, and
        a spring located between the ring main body and the closable element, wherein the spring includes a compressed configuration and a non-compressed configuration, and
    wherein the ring assembly is in the open alignment when the spring is in the compressed configuration, and the ring assembly is in the closed alignment when the spring is in the non-compressed configuration.

12. A hanger organizer, comprising:
    a. a hanging element;
    b. a connector having a top side and a bottom side;

wherein the hanging element is connected to the top side; and wherein the bottom side comprises a 360 degree rotatable transverse support, and c. a ring assembly having an open orientation and a closed orientation, located movably around the transverse support, the ring assembly comprising a ring main body, one or more closable elements in hinged attachment to the ring main body, and a biasing element located between the ring main body and the closable element, wherein the biasing element includes an active configuration and an inactive configuration, and wherein the ring assembly is in the open orientation when the biasing element is in the active configuration, and wherein the ring assembly is in the closed orientation when the biasing element is in the inactive configuration.

13. The hanger organizer of claim 12, wherein, the hanging element is connected to a bar.

\* \* \* \* \*